(12) United States Patent
Malalangaradhos

(10) Patent No.: US 10,664,425 B2
(45) Date of Patent: May 26, 2020

(54) ADJUSTING INTERRUPT PRIORITIES

(71) Applicant: Intel Corporation, Santa Clara, CA (US)

(72) Inventor: SampathKumar Malalangaradhos, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/133,554

(22) Filed: Sep. 17, 2018

(65) Prior Publication Data

US 2020/0089633 A1    Mar. 19, 2020

(51) Int. Cl.
*G06F 13/26* (2006.01)
*G06F 16/23* (2019.01)

(52) U.S. Cl.
CPC .............. *G06F 13/26* (2013.01); *G06F 16/23* (2019.01)

(58) Field of Classification Search
CPC ................................. G06F 13/26; G06F 13/23
USPC ........................................................ 710/265
See application file for complete search history.

(56) References Cited

U.S. PATENT DOCUMENTS

| 6,006,303 | A  | * | 12/1999 | Barnaby ........... G06F 13/18 710/240 |
| 6,601,122 | B1 | * | 7/2003 | Broberg, III ........ G06F 9/4812 710/266 |
| 2015/0188829 | A1 | * | 7/2015 | Satpathy ............ H04L 47/2458 370/236 |

* cited by examiner

*Primary Examiner* — Chun Kuan Lee
(74) *Attorney, Agent, or Firm* — Lowenstein Sandler LLP

(57) ABSTRACT

A processor may include a core to execute interrupt latency control unit (ILCU) software and an interrupt controller circuitry. The interrupt controller circuitry includes: a first register to store a first time value at which a first interrupt is received at the interrupt controller circuitry and a second register to store a second time value at which the first interrupt is delivered to the core. The ILCU software is to: read the first time value in the first register and the second time value in the second register; determine an amount of time the first interrupt was pending at the interrupt controller circuitry; determine interrupt configuration information that adjusts the first interrupt priority of a subsequent interrupt; and send the interrupt configuration information to the interrupt controller circuitry. The interrupt controller circuitry is to adjust the first interrupt priority of the subsequent interrupt to the second interrupt priority.

20 Claims, 14 Drawing Sheets

400

Read a first time value at which a first interrupt is received at an interrupt controller circuitry and a second time value at which the first interrupt is delivered to a core by the interrupt controller circuitry, the first interrupt having a first interrupt priority for a first type of interrupt.
410

Determine an amount of time the first interrupt was pending at the interrupt controller circuitry before the first interrupt was received by the core using the first time value and the second time value.
420

Determine interrupt configuration information that adjusts the first interrupt priority of a subsequent interrupt of the first type to a second interrupt priority that is different than the first interrupt priority
430

Send the interrupt configuration information to the interrupt controller circuitry
440

FIG. 4

ADJUSTING INTERRUPT PRIORITIES

TECHNICAL FIELD

Embodiments of the disclosure relate generally to hardware processors, and more specifically, but without limitation, to adjusting interrupt priority levels of hardware interrupts.

BACKGROUND

Conventional computer systems provide a static view of interrupt priority. Typically, the interrupt priorities are defined by a computer system architect. For example, the system architect determines the priority (or hierarchy) of the interrupts. The determination of interrupt priorities can be time consuming. For instance, during testing of interrupt priorities, the system architect may adjust an interrupt priority numerous times based on a trial and error approach. An incorrect determination of an interrupt priority can negatively impact a computer system. For instance, an incorrectly assigned interrupt priority can cause (or preempt) a high priority interrupt from entering into the system.

In some instances, an operating system needs to maintain strict timing of embedded systems (e.g., modem (4G/5G)) to the network. As such, latency of an interrupt at the hardware level can have significant impact on the timing of embedded systems (e.g., modem (4G/5G)). In conventional computer systems, the operating system is unable to determine how much time an interrupt is waiting at the hardware level before arriving at the central processing unit (CPU). Moreover, in conventional computer systems, the interrupt priority is static and is not able to be automatically adjusted. Accordingly, there is a need to determine how much time an interrupt is waiting at the hardware level before arriving at the CPU. Additionally, there is a need to automatically adjust an interrupt priority based on time values associated with the duration of time an interrupt is waiting at the hardware level.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates a flow diagram of adjusting an interrupt priority according to various embodiments.

DETAILED DESCRIPTION

The embodiments described herein are directed to determining the interrupt latency of interrupts at an interrupt control unit (ICU). As described above, in conventional systems, the operating system is unable to determine how much time an interrupt is waiting at the hardware level (e.g., ICU) before arriving at the central processing unit (CPU). By not knowing the latency time at the ICU, interrupts with a high priority may undergo undue latency at the ICU before arriving at the CPU for processing. Accordingly, by knowing the interrupt latency of interrupts at the ICU, real-time performance of the computing system is improved. For example, in some embodiments, latency of each interrupt at the ICU is stored. The stored latency values are then used to facilitate in determining whether an interrupt priority of an interrupt at the ICU is to be automatically adjusted (e.g., increase interrupt priority). By increasing the interrupt priority the undue latency at the ICU is reduced or eliminated. As a result, performance of the computer system is increased.

Various embodiments described herein are directed to determining the interrupt latency of interrupts at an ICU to facilitate in adjusting an interrupt priority at the ICU. In one embodiment, a processor includes a core to execute an interrupt latency control unit (ILCU), and an interrupt controller circuitry coupled to the core. The interrupt controller circuitry includes a first register to store a first time value at which a first interrupt is received at the interrupt controller circuitry, and a second register to store a second time value at which the first interrupt is delivered to the core by the interrupt controller circuitry. The ILCU is to: read the first time value in the first register and the second time value in the second register in response to the core receiving the first interrupt, the first interrupt having a first interrupt priority for a first type of interrupt; determine an amount of time the first interrupt was pending at the interrupt controller circuitry before the first interrupt was received by the core using the first time value and the second time value; determine interrupt configuration information that adjusts the first interrupt priority of a subsequent interrupt of the first type to a second interrupt priority that is different than the first interrupt priority; and send the interrupt configuration information to the interrupt controller circuitry.

Figure 1A:
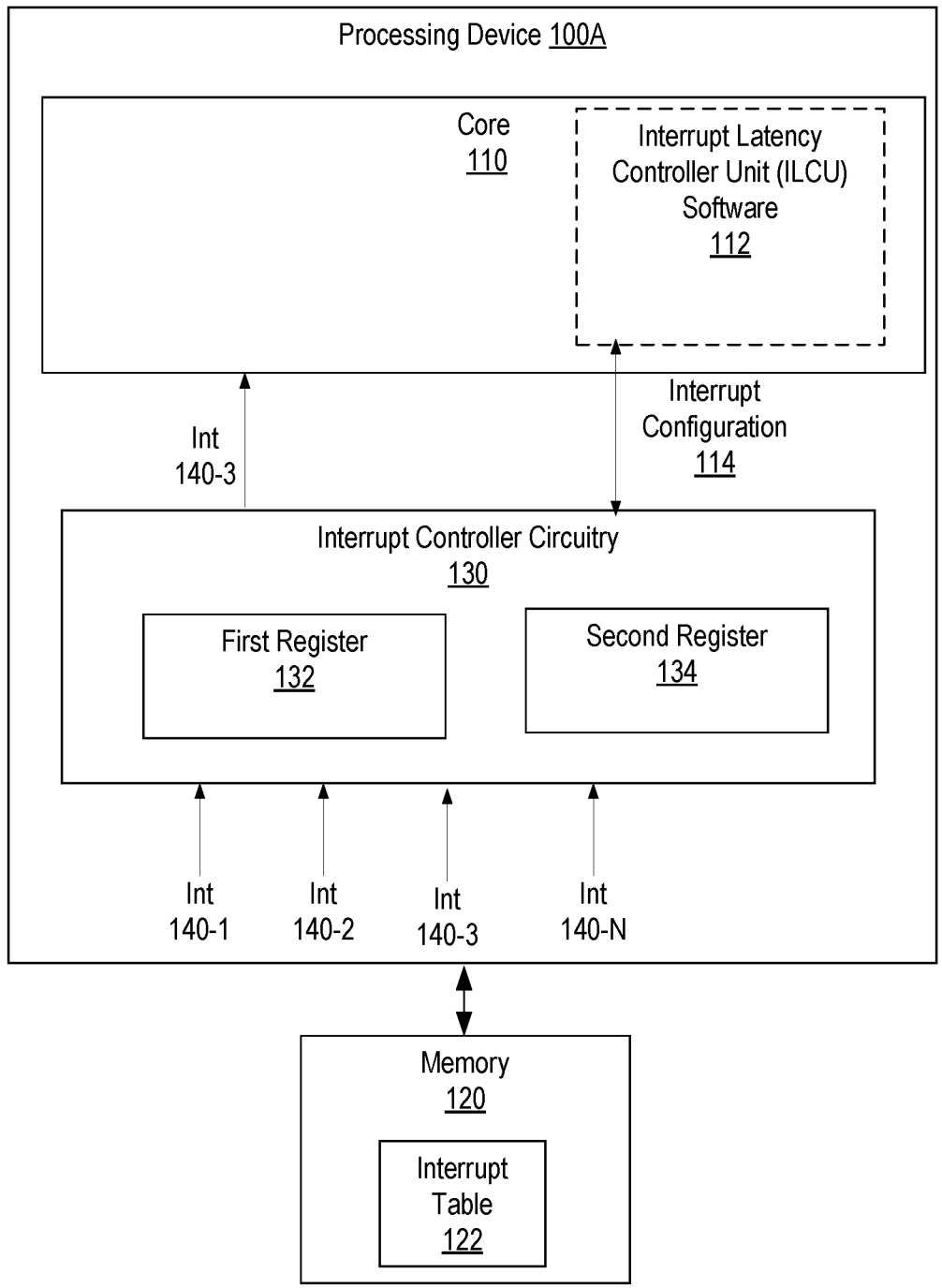
FIG. 1A illustrates a block diagram of a processing device coupled to memory according to various embodiments.

FIG. 1A depicts processing device 100A that may be representative of various embodiments. Processing device 100A, in various embodiments, is a CPU, graphics processing unit (GPU), a system-on-chip (SOC) and the like.

Processing device 100A, in various embodiments, includes core 110, interrupt controller circuitry 130 (e.g., ICU) and interrupt latency controller 112. Processing device 100A can include a plurality of cores. For example, processing device 100A can include two or more cores.

In one embodiment, processing device 100A is coupled to memory 120. In various embodiments, processing device 100A includes memory 120.

As shown in FIG. 1A, interrupt controller circuitry 130 handles a plurality of interrupts 140. Interrupt controller circuitry 130, in various embodiments, handles interrupts from various peripheral devices. For example, interrupt controller circuitry 130 handles a plurality of interrupts. The interrupt controller circuitry passes the request on to the processor (or core). In one embodiment, the interrupt controller circuitry indicates to the processor which device issued the request (e.g., which interrupt number that triggered the request).

For example, interrupt controller circuitry 130 handles interrupts 140-1 through 140-N. In various embodiments, an interrupt is a signal to the processor emitted by hardware (e.g., a peripheral device) indicating an event that needs immediate attention. An interrupt alerts the processor to a high-priority condition requiring the interruption of the current code the processor is executing. For example, interrupts are used by devices to communicate that they require attention from the operating system. In some embodiments, hardware interrupts are implemented using electronic alerting signals (e.g., interrupt request (IRQ)) that are sent to the processor from an external device, which is either a part of the computer itself, such as a disk controller, or an external peripheral. For example, pressing a key on the keyboard or moving the mouse triggers hardware interrupts that cause the processor to read the keystroke or mouse position.

Figure 2:
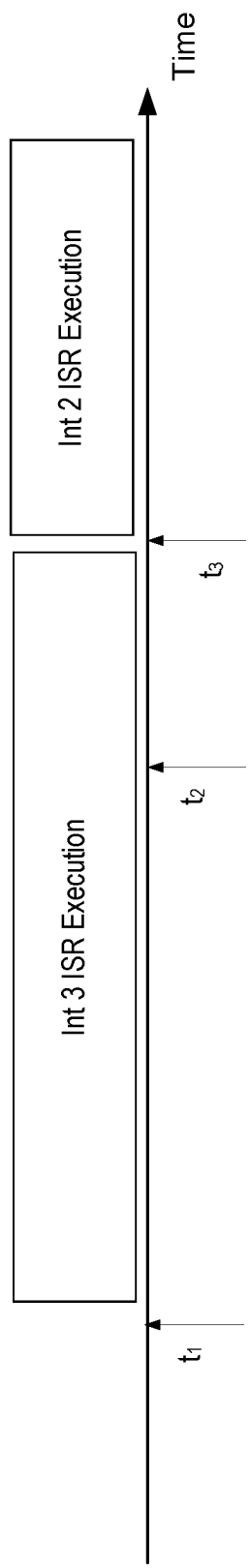
FIG. 2 illustrates a timeline of interrupts arriving at an interrupt controller circuitry according to various embodiments.

As described above, in conventional computer systems, the operating system is unable to determine how much time an interrupt is waiting at the hardware level (e.g., interrupt controller circuitry) before arriving at the central processing unit (CPU). FIG. 2 illustrates how much time an interrupt waits at the interrupt controller circuitry before arriving at the CPU. Referring to FIG. 2, interrupt 3 (e.g., interrupt 140-3) arrives at the interrupt controller circuitry 130 at time, $t_1$. Upon receiving interrupt 3, the CPU starts executing the interrupt service routine (ISR) of the interrupt. An ISR (also referred to as an interrupt handler) is a software process invoked by an interrupt request from a hardware device. The execution of the ISR interrupts a current process executed by the CPU. When the ISR is complete, the process (interrupted by the ISR) is resumed.

Interrupt 2 (e.g., interrupt 140-2) arrives at the interrupt controller circuitry 130 from a peripheral device, at time, $t_2$. When interrupt 2 arrives at the interrupt controller circuitry, the interrupt controller circuitry does not deliver interrupt 2 to the CPU. Interrupt controller circuitry does not deliver interrupt 2 to the CPU because interrupt 3 has a higher interrupt priority than interrupt 2. As such, interrupt 2 waits until time, $t_3$, to be sent to the CPU. Time, $t_3$, is the time that the interrupt 3 ISR is acknowledged (e.g., end of interrupt (EOI)). Accordingly, interrupt 2 waited at the interrupt controller circuitry from time, $t_2$ to time, $t_3$. Therefore, the latency introduced to interrupt 2 is $t_3$-$t_2$. The latency introduced to interrupt 2 (e.g., $t_3$-$t_2$) is not able to be determined in conventional computing systems, as described herein.

An interrupt priority level of an interrupt determines when an interrupt will be seen by the CPU (with respect to the interrupt priority levels of other interrupts). For example, in conventional systems, a first interrupt with a priority level of 15 (e.g., 15 being the highest priority level) will have a higher priority level than a second interrupt with a priority level of 5. In such an example, the first interrupt (at priority level 15) will be handled by the CPU before the second interrupt (at priority level 5). More specifically, in conventional systems, if the first interrupt (at priority level 15) arrives during execution of the ISR of the second interrupt (at priority level 5), then the executing of the ISR of the second interrupt is interrupted to allow for the executing of the ISR of the first interrupt.

In various embodiments, the system architect configures the priority levels of each interrupt in the system. For example, a system includes 0 to 15 levels of priority and 20 peripheral interrupt lines. The system architect configures each line to have a certain priority level ranging from 0 to 15. In such an example, some of the lines (e.g., lines 18 and 19) have the same priority. Whenever a higher priority interrupt is getting served by CPU (e.g., IPL 15), interrupt lines with lower IPL (e.g., lines 14, 13 . . . so on) wait at the ICU level until the high priority interrupt routine is completed.

Referring again to FIG. 1A, in various embodiments, interrupt controller circuitry 130 includes a first register 132 (e.g., interrupt arrival time register) and a second register 134 (e.g., interrupter delivery time register) that enables the operating system to determine how much time an interrupt is waiting at the interrupt controller circuitry before arriving at the CPU. In particular, first register 132 stores an arrival time (e.g., interrupt arrival time (IAT)) of an interrupt at the interrupt control circuitry. For example, the time (e.g., 50.50 microseconds (µs)) that interrupt 140-3 arrives at interrupt control circuitry 130. Similarly, second register 134 stores the time that the interrupt is delivered from the interrupt controller circuitry to the CPU (e.g., interrupt delivery time (IDT)). For example, the time (e.g., 50.75 µs) that interrupt 140-3 is delivered to the CPU (or core). In view of the previous example, the time an interrupt waits at the hardware level before arriving at the CPU is determined (e.g., 0.25 µs). It should be appreciated that the time unit of the IAT and IDT can be any time unit (e.g., nanosecond, millisecond, etc.). It is noted that first register 132 and second register 134 store an IAT and an IDT per interrupt. For example, first register 132 stores the IAT for interrupt 140-3 and second register 134 stores IDT for interrupt 140-3. Upon interrupt 140-3 being executed, first register 132 and second register 134 are cleared for storing an IAT/IDT of a different interrupt (e.g., interrupt 140-1). Alternatively, in one embodiment, the ICU includes a first vector register for storing the IATs of interrupts and a second vector register for storing the respective IDTs of the interrupts.

In one embodiment, upon an interrupt delivered to the CPU, the time value in the first register and the time value in the second register associated with the interrupt are stored in a data structure (e.g., table 122) in memory 120. The stored time values are used for subsequent instances of the interrupt (and/or other interrupts). In various embodiments, the time values for a plurality of interrupts (e.g., each interrupt) at the interrupt controller circuitry 130 are stored in table 122 in memory 120.

Table 1 below depicts an embodiment of an interrupt table 122 stored in memory 120.

TABLE 1

| Interrupt Number | Interrupt Arrival Time (μs) | Interrupt Delivery Time (μs) |
|---|---|---|
| 2 | 34.56 | 35.56 |
| 3 | 40.25 | 40.25 |
| 128 | 102.56 | 103.01 |
| ⋮ | ⋮ | ⋮ |
| N | . | . |

As shown in Table 1, an instance of interrupt 2 (arriving at interrupt controller circuitry 130 (at 34.56 μs) and delivered to the CPU (at 35.56 μs)) has a latency time of 1 μs at interrupt controller circuitry 130. An instance of interrupt 3 (arriving at interrupt controller circuitry 130 (at 40.25 μs) and delivered to the CPU (at 40.25 μs)) has a latency time of 0 μs at interrupt controller circuitry 130. An instance of interrupt 128 (arriving at interrupt controller circuitry 130 (at 102.56 μs) and delivered to the CPU (at 40.25 μs)) has a latency time of 0.54 μs at interrupt controller circuitry 130. In various embodiments, the IAT and IDT of an interrupt is the most recent instance of the interrupt that arrived at the interrupt controller circuitry and sent to the core for processing.

In various embodiments, an interrupt listed in interrupt Table 1 is associated with a corresponding assigned interrupt priority and corresponding interrupt type. For example, interrupt 2 in Table 1 corresponds to an interrupt having a first assigned priority (e.g., interrupt priority 10) having a first type of interrupt (e.g., an interrupt generated by a keyboard), interrupt 3 corresponds to an interrupt having a second assigned priority (e.g., interrupt priority 9) having a second type of interrupt (e.g., an interrupt generated by a mouse) and so on.

In various embodiments, the IAT and IDT of an interrupt are updated in response to a subsequent arrival of an interrupt (e.g., interrupt 2) and delivery to the core. For example, a new interrupt 2 (or real-time interrupt 2) arrives at the interrupt controller circuitry 130. As a result, the first register is cleared and a new IAT (e.g., 190.00 μs), corresponding to the new interrupt 2, is stored at the first register. Likewise, the new interrupt 2 is delivered to the CPU at new IDT (e.g., 190.05 μs). As a result, the second register is cleared and the new IDT, corresponding to the new interrupt 2, is stored in the second register. Additionally, upon delivery of the new interrupt 2 to the CPU, the IAT and IDT, correspond to the new interrupt 2, is updated in data table 122 with the new IAT (e.g., 190.00 μs) and the new IDT (e.g., 190.05 μs).

As described herein, in various embodiments, the stored IAT and IDT values in table 122 facilitate in determining whether an interrupt priority of a current (or real-time) interrupt at the ICU is to be automatically adjusted (e.g., increase or decrease interrupt priority). In particular, in various embodiments, interrupt latency controller unit (ILCU) 112 (e.g., a software module executed by core 110) is able to monitor table 122 and generate interrupt configuration information that adjusts interrupt priorities accordingly.

In various embodiments, ILCU 112 is a software entity which is used to monitor the table 122. The software entity can be an operating system, dedicated task, or the interrupt controller driver. ILCU 112 can monitor the table and take corrective actions at various points in time. ILCU 112 can monitor the table and the delay occurred in various interrupts and take corrective actions (e.g., increase/decrease of priority level) if needed. Additionally, ILCU 112 can periodically monitor the table (e.g., every 10 minutes) and take corrective actions if needed. In another example, when an operating system (OS) is acting as the ILCU, the OS monitors the table and makes corrective actions when the system is idle or when a new task is scheduled. In various embodiments, ILCU 112 is software, circuitry, or as a state machine in a core.

In various embodiments, each interrupt line is configurable at the ICU level. The ILCU can write to the associated configuration register to reflect the new priority value of the interrupt line (e.g., increase/decrease priority).

In one example, a new (or real-time) interrupt 2 (having an interrupt priority of 12, where an interrupt priority of 15 is the highest priority) arrives at the interrupt controller circuitry 130. ILCU 112 looks up an IAT and IDT for previous interrupt 2 in table 122. ILCU 112 determines that the previous latency of interrupt 2 at interrupt controller circuitry is too large (e.g., 1 μs). For example, ILCU 112 determines the amount of time a previous interrupt 2 was pending at the interrupt controller circuitry is too large.

In response to determining that the latency of a previous occurrence of interrupt 2 is too large, ILCU 112 generates interrupt configuration 114 to modify the assigned priority level of interrupt 2 (e.g., interrupt priority of 12). More specifically, interrupt configuration 114 is configuration information that instructs interrupt controller circuitry 130 to change the interrupt priority level of interrupt 2 (e.g., from 12 to 14). Upon interrupt configuration 114 received by interrupt controller circuitry 130, interrupt controller circuitry 130 increases the interrupt priority level of interrupt 2 (e.g., from 12 to 14). As a result, the latency time of interrupt 2 (having an increased interrupt priority) at interrupt controller circuitry 130 should be decreased or eliminated.

In another example, a new (or real-time) interrupt 2 (having an interrupt priority of 12 where 15 is the highest priority) arrives at the interrupt controller circuitry 130. ILCU 112 looks up an IAT and IDT for previous interrupt 2 in table 122 and the IAT/IDT of other interrupts such as interrupt 128 (in Table 1). ILCU 112 determines that the previous latency of interrupt 2 at interrupt controller circuitry is too large (e.g., 1 μs). For example, ILCU 112 determines the amount of time a previous interrupt 2 was pending at the interrupt controller circuitry is too large.

ILCU 112 also determines that the latency of interrupt 2 is based, in part, on the latency of interrupt 128 (because interrupt 128 has an interrupt priority of 13 that is higher than the interrupt priority of interrupt 2). Upon determining that the latency of a previous occurrence of interrupt 2 is too large (based at least in part on interrupt 128), ILCU 112 generates interrupt configuration 114 to modify the currently assigned priority of interrupt 2. More specifically, interrupt configuration 114 is configuration information that instructs interrupt controller circuitry 130 to change the interrupt priority of interrupt 2 to an interrupt priority that is higher than the interrupt priority of interrupt 128 (e.g., from 12 to 14). Upon receiving interrupt configuration 114, interrupt controller circuitry 130 increases the interrupt priority of interrupt 2 (e.g., from 12 to 14). As a result, the latency time of interrupt 2 (having an increased interrupt priority) at interrupt controller circuitry 130 is decreased or eliminated.

Alternatively, in one embodiment, the interrupt priority of interrupt 128 is lowered (e.g., from 13 to 11) such that it has an interrupt priority that is lower than interrupt 2. As a result, the latency time of interrupt 2 (having an interrupt priority higher than interrupt 128) at interrupt controller circuitry 130 is decreased or eliminated.

Figure 1B:
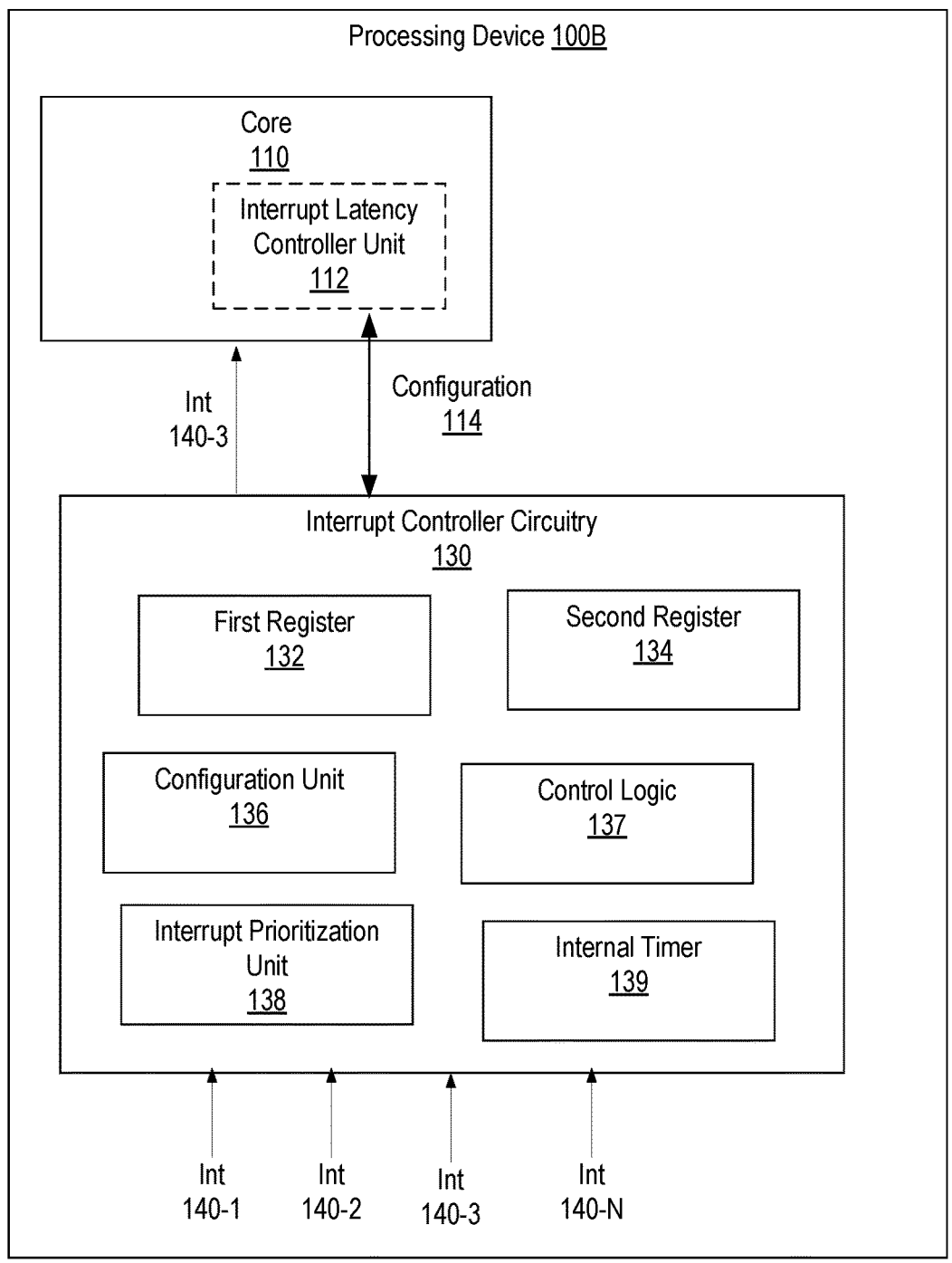
FIG. 1B illustrates a block diagram of a processing device coupled to memory according to various embodiments.

FIG. 1B depicts an embodiment of processing device 100B. Processing device 100B is similar to processing device 100A. However, interrupt controller circuitry 130 of processing device 100B includes configuration unit 136, control logic 137, interrupt prioritization unit 138 and internal timer 139.

Configuration unit 136 enables the master/slave relationship of the CPU and the interrupt controller circuitry. For example, the master is the CPU and the slave is the interrupt controller circuitry. The configuration unit of ICU provides various configuration parameters of an interrupt line such as priority level, detection mechanism (e.g., edge/level triggered), mask configuration (interrupt can be masked or not), status reporting of interrupt lines, clearing the interrupt lines, etc. The CPU will make use of this configuration unit for the configuration purpose of each interrupt lines and also for reading the status.

Control logic 137, in one embodiment, controls how the interrupts are handled by the interrupt controller circuitry. In various embodiments, control logic 137 acts based on the configuration unit values that were configured by CPU. Additionally, control logic 137 is responsible for prioritization of interrupts occurring from the devices/peripherals. For example, when a high and low priority interrupt occurs at same time in the system, control logic 137 determines which interrupt wins (by comparing priority value configurations of those interrupt lines) and forwards the winning interrupt line to the CPU.

Interrupt prioritization unit 138, in one embodiment, is a part of control logic 137. Interrupt prioritization unit 138 primarily looks at the incoming interrupts from devices/peripherals and chooses the highest priority among the incoming interrupts. In one embodiment, interrupt prioritization unit 138 determines the highest interrupt priority of the incoming interrupts for execution by the CPU. In another embodiment, interrupt prioritization unit 138 determines the highest interrupt priority of the incoming interrupts (responsive to one or more interrupt priority being adjusted) for execution by the CPU.

Internal timer 139, in one embodiment, provides a time stamp of the IAT and the IDT when they are sent to the CPU. Internal timer unit 139 runs on its own clock and power in the system. When any incoming interrupt comes, it registers its time stamp in the respective interrupt line's IAT. When the interrupt is delivered to CPU, it registers the timestamp in the respective interrupt's IDT.

Figure 1C:
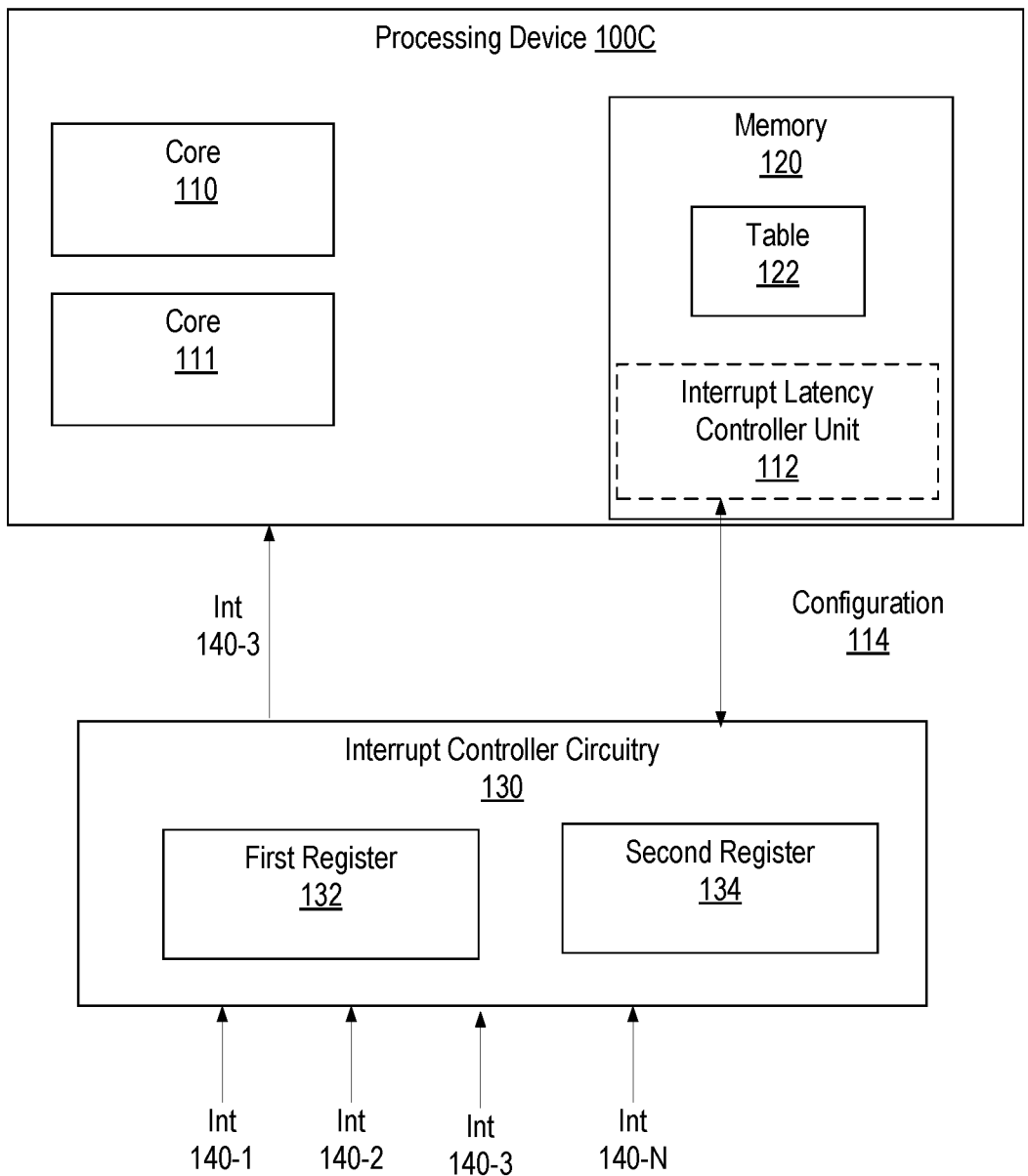
FIG. 1C illustrates a block diagram of a processing device coupled to an interrupt controller circuitry according to various embodiments.

FIG. 1C depicts an embodiment of processing device 100C. Processing device 100C is similar to processing devices 100A and 100B. However, processing device 100C includes a plurality of cores (e.g., core 110 and core 111). Additionally, processing device 100C does not include interrupt controller circuitry 130. That is, interrupt controller circuitry 130 is separate from processing device. Additionally, in various embodiments, processing device 100C includes memory 120.

Figure 3:
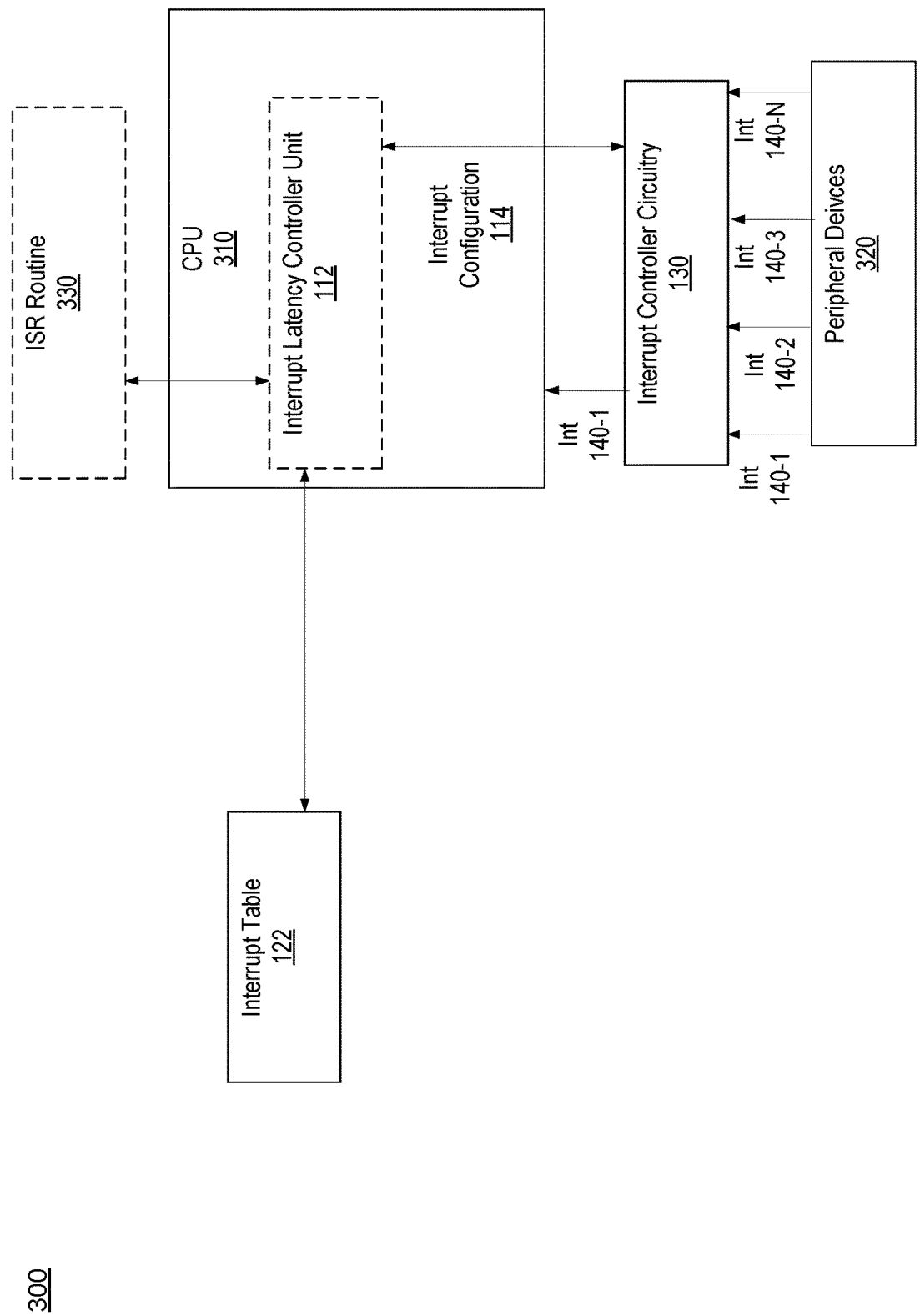
FIG. 3 illustrates a flow diagram of interrupts arriving at an interrupt controller circuitry according to various embodiments.

FIG. 3 depicts an embodiment of computing system 300 for adjusting interrupt priorities. Computing system 300 includes peripheral devices 320 (e.g., printer, modem, mouse, etc.), interrupt controller circuitry 130, CPU 310, interrupt latency controller 112, ISR routine 330 and interrupt table 122.

Peripheral devices 320 can be any hardware device that generates an interrupt to be received by interrupt controller circuitry 130. For example, peripheral devices 320 generate interrupts 140-1 through 140-N which are received by interrupt controller circuitry 130. As described above, an interrupt is a signal to the processor emitted by a peripheral device indicating an event that needs immediate attention. An interrupt alerts the processor to a high-priority condition requiring the interruption of the current code the processor is executing. The various interrupts handled at the interrupt controller circuitry 130 have an interrupt priority. In various embodiments, one or more of the interrupts have a priority that is different (e.g., higher or lower) than another interrupt at interrupt controller circuitry 130. In some embodiments, the plurality of interrupts, at the interrupts controller circuitry 130, have the same interrupt priority level.

As stated above, interrupt controller circuitry 130 includes two registers (not shown in FIG. 3) for storing the IAT of an interrupt and an IDT of the interrupt. For example, a first register (e.g., register 132) stores the IAT of interrupt 140-1 and a second register (e.g., register 134) store an IDT of interrupt 140-1.

In various embodiments, ILCU 112 monitors table 122 and generates interrupt configuration 113 for adjusting interrupt priorities. For example, interrupt 140-1 is received at interrupt controller circuitry 130. Interrupt 140-1 is generated by a peripheral device (e.g., modem (4G/5G)) where latency of the interrupt can have a significant impact on timing of the peripheral device to the network. ILCU 112 monitors stored latencies of interrupt 140-1 and/or other interrupts (e.g., interrupts 140-2 through 140-N), at table 122. ILCU 112 determines that a latency of previous occurrence of interrupt 140-1 at interrupt controller circuitry 130 is excessive which could cause a detrimental impact on the timing of the corresponding device with the network. Accordingly, ILCU 112 generates interrupt configuration 114 to increase the interrupt priority of interrupt 140-1.

Interrupt controller circuitry 130, upon receiving interrupt configuration 114, increases the interrupt priority of interrupt 140-1. In such an example, the interrupt priority of interrupt 140-1 is increased such that it is higher than one or more of interrupt priorities of other interrupts at interrupt controller circuitry 130. As a result, interrupt 140-1 (having a higher interrupt priority) is sent to CPU 310 before one more other interrupts. Accordingly, interrupt 140-1 has a reduced latency at interrupts controller circuitry 130 with respect to a previous latency of interrupt 140-1. Upon CPU 310 receiving interrupt 140-1, the CPU processes ISR routine 330 of interrupt 140-1.

In an alternative example, CPU 310 includes a plurality of cores (e.g., cores 110 and 111 in FIG. 1C). Additionally, interrupt 140-1 is scheduled to be executed at a first core (e.g., core 110). ILCU 112 determines that a latency of previous occurrence of interrupt 140-1 at interrupt controller circuitry 130 is excessive which could cause a detrimental impact on the timing of the corresponding device with the network. ILCU 112 also determines that execution of interrupt 140-1 at the second core (rather than the originally scheduled core) would reduce the latency at interrupt controller circuitry 130. Accordingly, ILCU 112 generates interrupt configuration 114 to route the interrupt to the second core (e.g., an idle core) instead of raising the priority of the interrupt on the originally schedule first core. Upon CPU 310 receiving interrupt 140-1, the second core of the CPU processes ISR routine 330 of interrupt 140-1.

FIG. 4 depicts a flow diagram of method 400 for adjusting interrupts priorities, according to an embodiment.

At 410, a first time value at which a first interrupt is received at an interrupt controller circuitry and a second time value at which the first interrupt is delivered to a core by the interrupt controller circuitry is read. For example, a first instance of interrupt 140-3 (e.g., a previous instance of interrupt 140-3) is received at interrupt controller circuitry 130 and send to core 110. Accordingly, the IAT/IDT for interrupt 140-3 are initially stored in first register 132 and second register 134 respectively. Moreover, the IAT/DIT of interrupt 140-3 are then stored table 122. The ILCU 112 reads the IAT/IDT, in table 122, for interrupt 140-3 to facilitate in adjusting a subsequent instance of the first interrupt. It is noted that the first interrupt (e.g., 140-3) includes a first interrupt priority for a first type of interrupt. For example, interrupt 140-3 includes an assigned interrupt priority (e.g., interrupt priority 10) for a type of interrupt (e.g., a first type of interrupt from modem (4G/5G)).

At 420, an amount of time the first interrupt was pending at the interrupt controller circuitry before the first interrupt was received by the core using the first time value and the second time value is determined. For example, ILCU 112 determines the time the first interrupt was pending (e.g., lag time) at the interrupt controller circuitry before the first interrupt was received by the core by determining the difference of the IAT and the IDT for the first interrupt stored in table 122.

At 430, interrupt configuration information that adjusts the first interrupt priority of a subsequent interrupt of the first type to a second interrupt priority that is different than the first interrupt priority is determined. For example, ILCU 112 determines that the lag time of the first interrupt, that was sent to the core, is excessive. Accordingly, for a subsequent instance of the first interrupt (e.g., a new real-time occurrence of interrupt 140-3), the ILCU generates interrupt configuration information 114 for adjusting the assigned interrupt priority of the first interrupt (e.g., interrupt priority 10) to a second (adjusted) interrupt priority (e.g., interrupt priority 12).

At 440, the interrupt configuration information is sent to the interrupt controller circuitry. For example, ILCU 112 transmits the interrupt configuration information to interrupt controller circuitry 130. Accordingly, upon a subsequent instance of the first interrupt received at interrupt controller circuitry 130 (e.g., having the assigned interrupt priority of 10), the interrupt controller circuitry 130 adjusts the initially assigned interrupt priority of the first interrupt to a second (adjusted) interrupt priority (e.g., interrupt priority of 12).

Figure 5A:
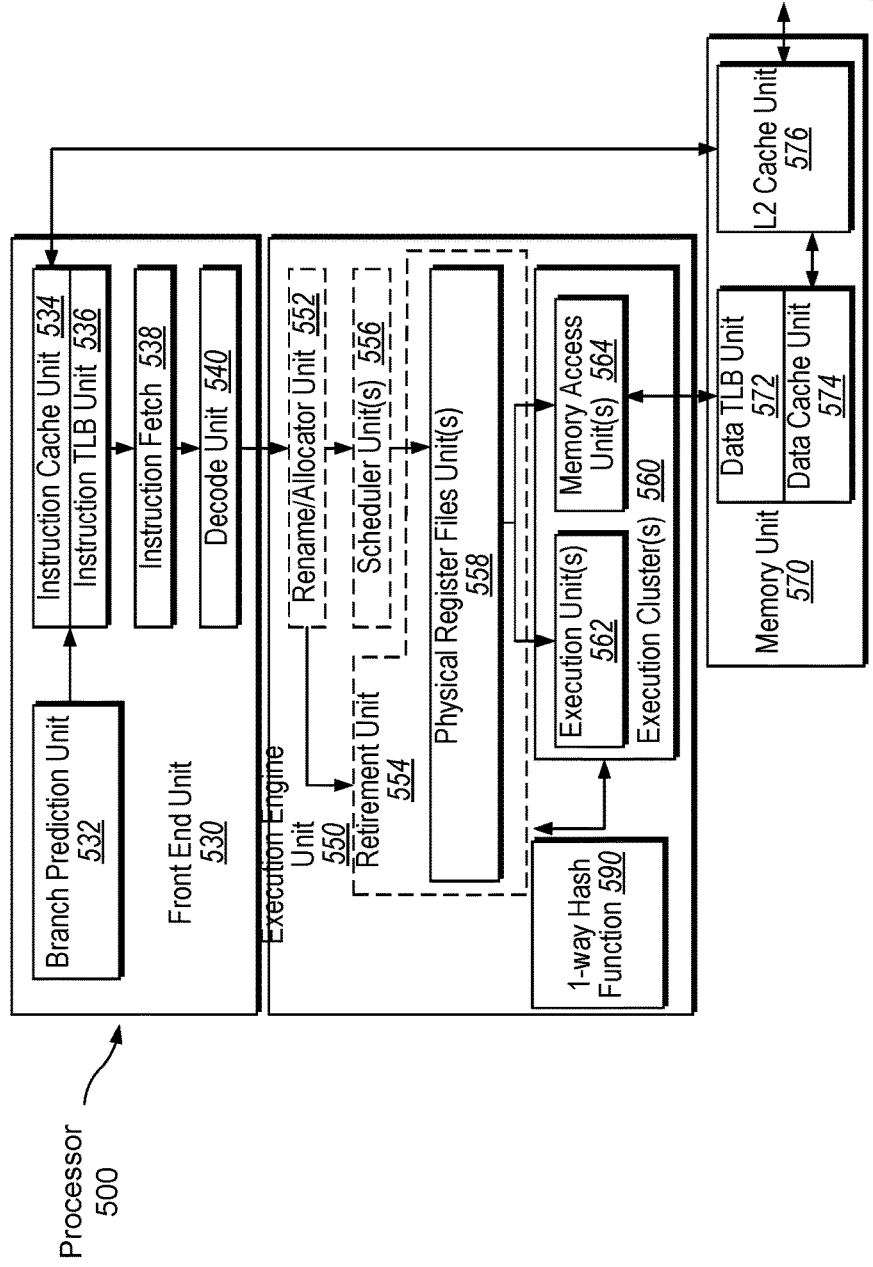
FIG. 5A is a block diagram illustrating a micro-architecture for a processor according to an embodiment of the disclosure.

FIG. 5A is a block diagram illustrating a micro-architecture for a processor 500 (e.g., processing device 100A, 100B, 100C, and CPU 310) that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
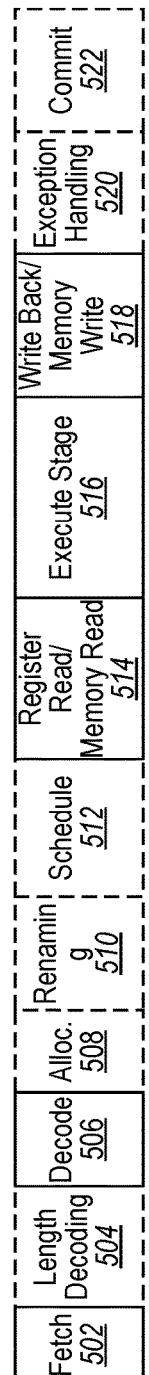
FIG. 5B is a block diagram illustrating an in-order pipeline and a register renaming stage, out-of-order issue/execution pipeline according to an embodiment of the disclosure.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
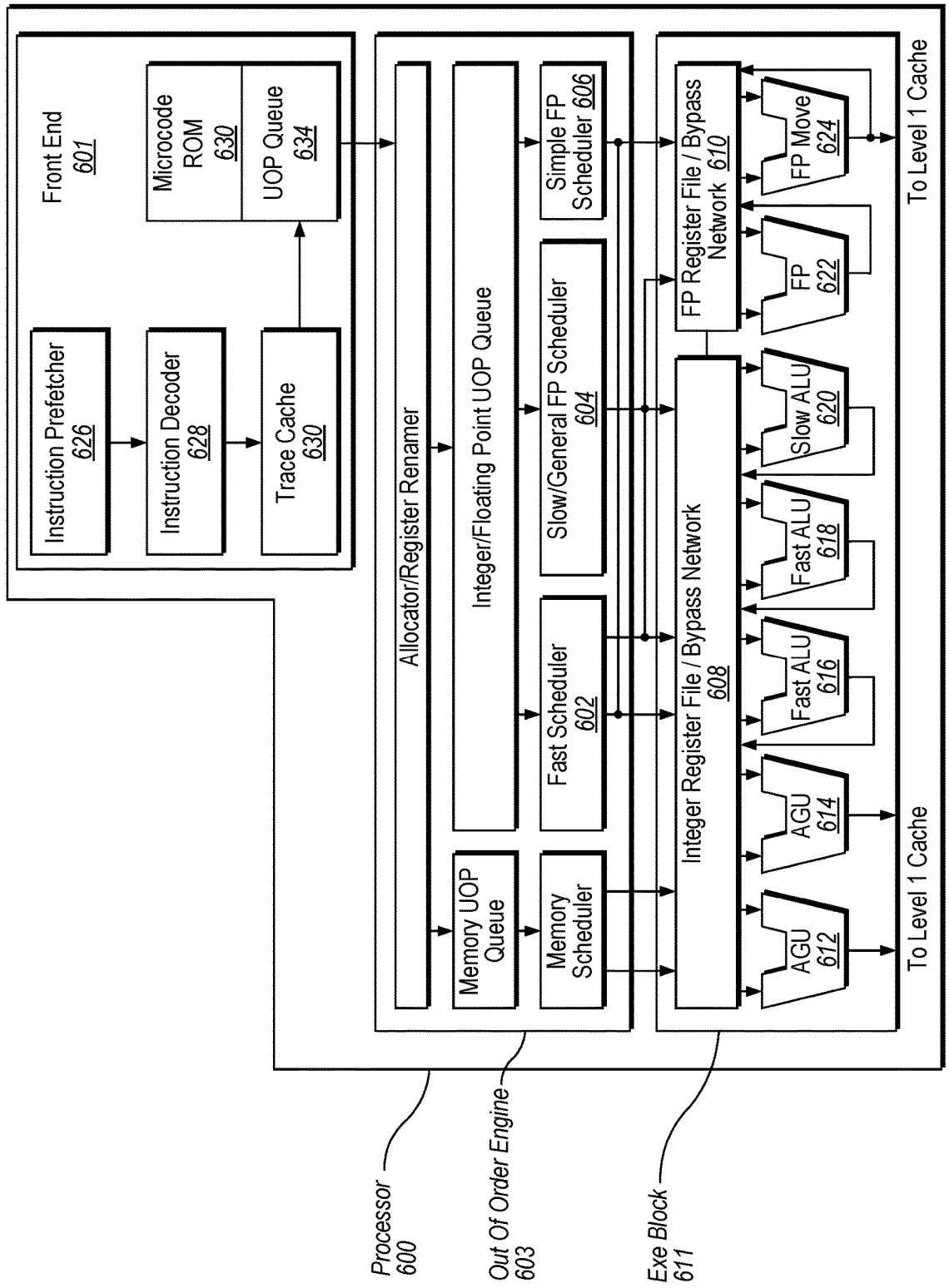
FIG. 6 is a block diagram illustrating a micro-architecture for a processor in accordance with one embodiment of the disclosure.

FIG. 6 illustrates a block diagram of the micro-architecture for a processor 600 (e.g., processing device 100A, 100B, 100C, and CPU 310) that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
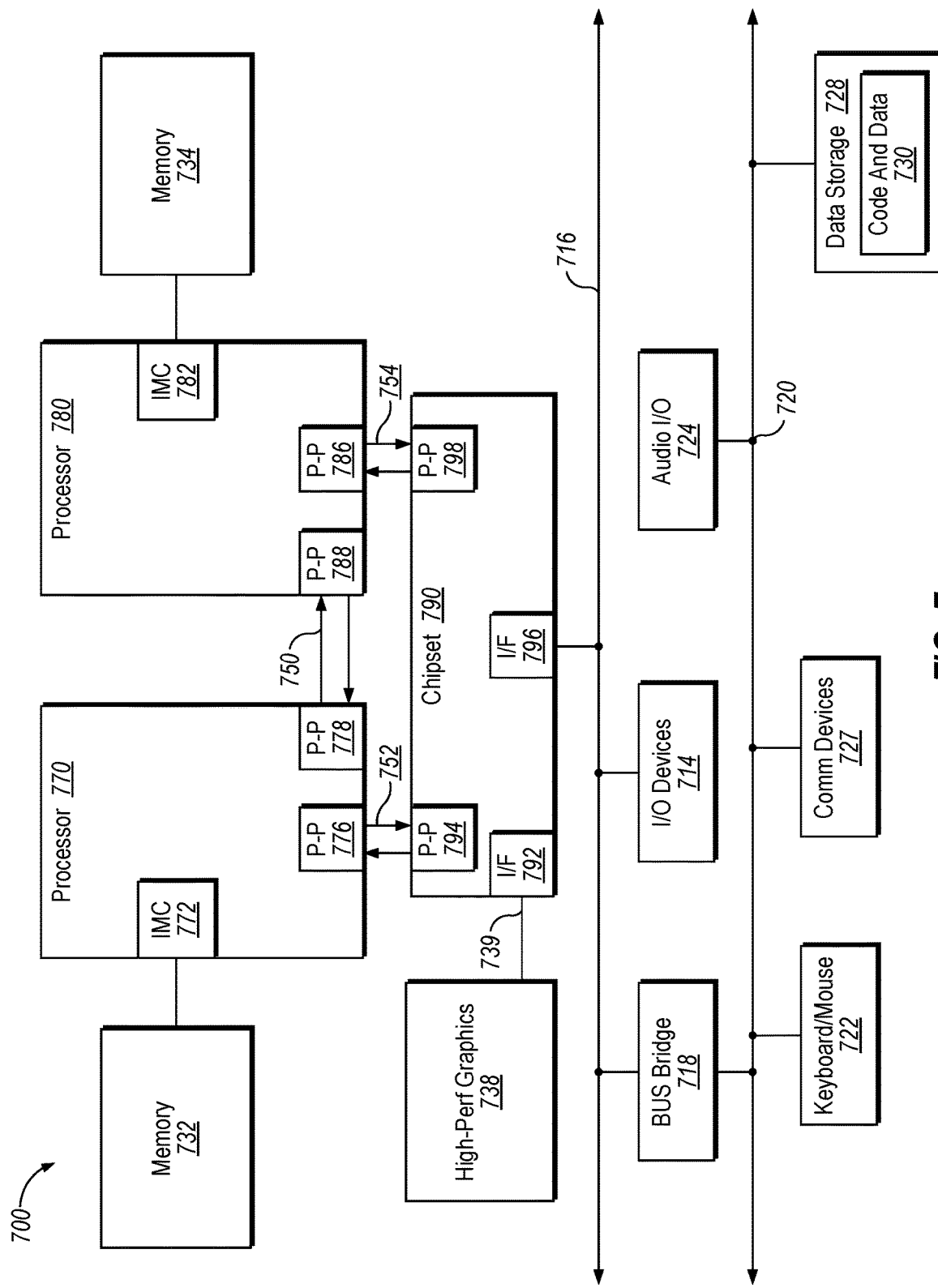
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 (e.g., processing device 100A, 100B, 100C, and CPU 310) and a second processor 780 (coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
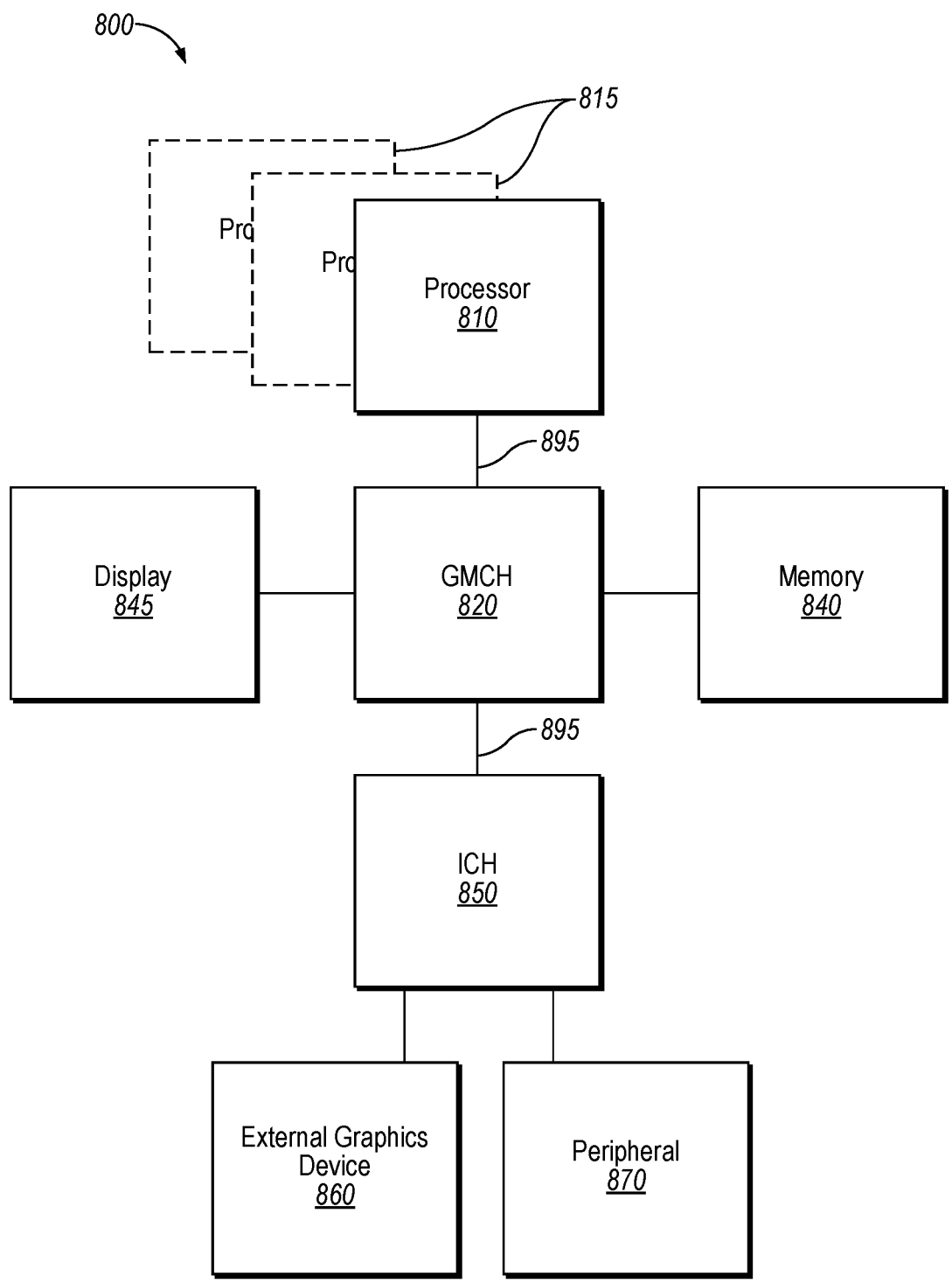
FIG. 8 is a block diagram illustrating a system in which an embodiment of the disclosure may operate.

Referring now to FIG. 8, shown is a block diagram of a system 800 in which one embodiment of the disclosure may operate. The system 800 may include one or more processors 810 (e.g., processing device 100A, 100B, 100C, and CPU 310), 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
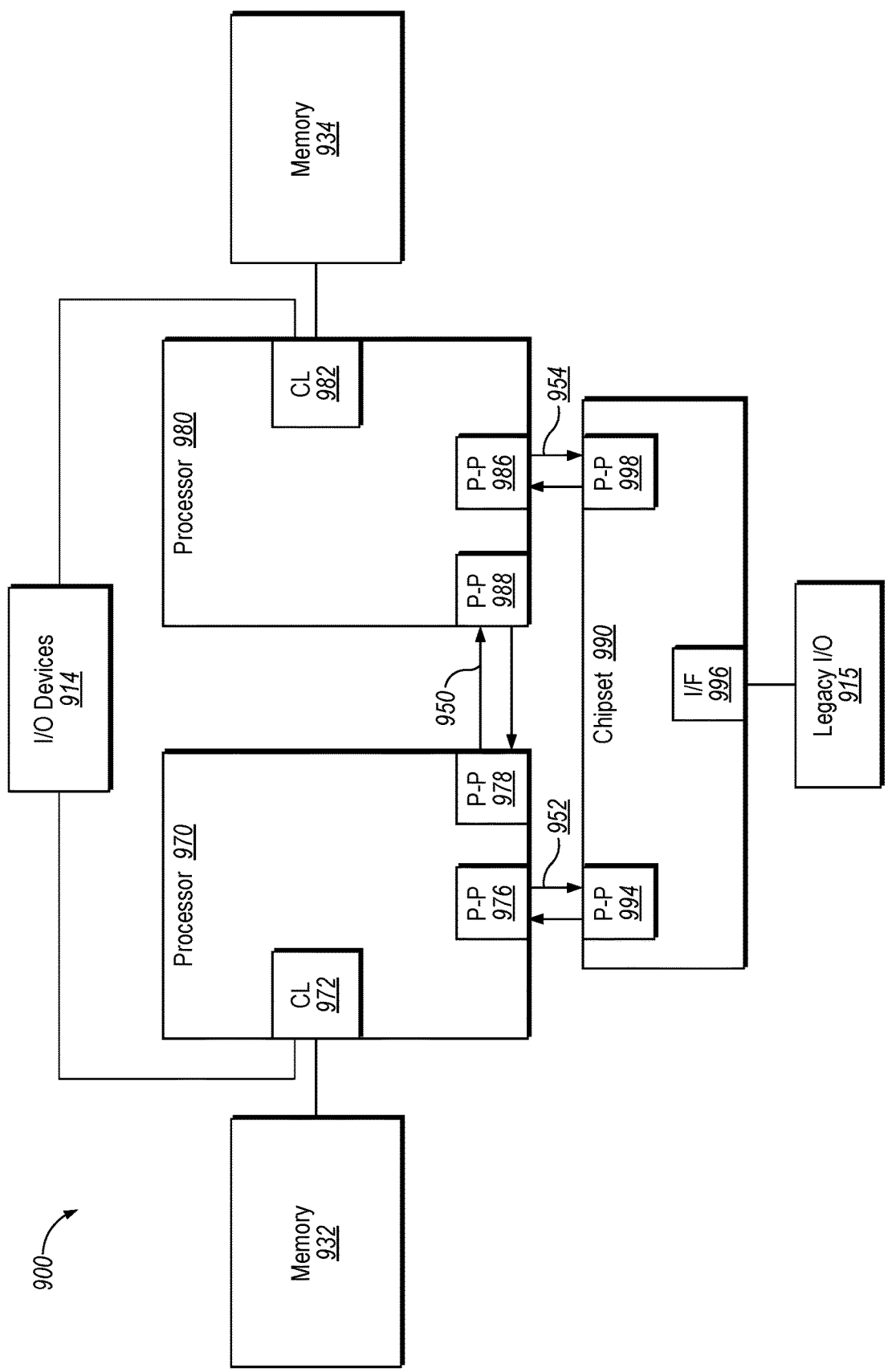
FIG. 9 is a block diagram illustrating a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 (e.g., processing device 100A, 100B, 100C, and CPU 310) may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
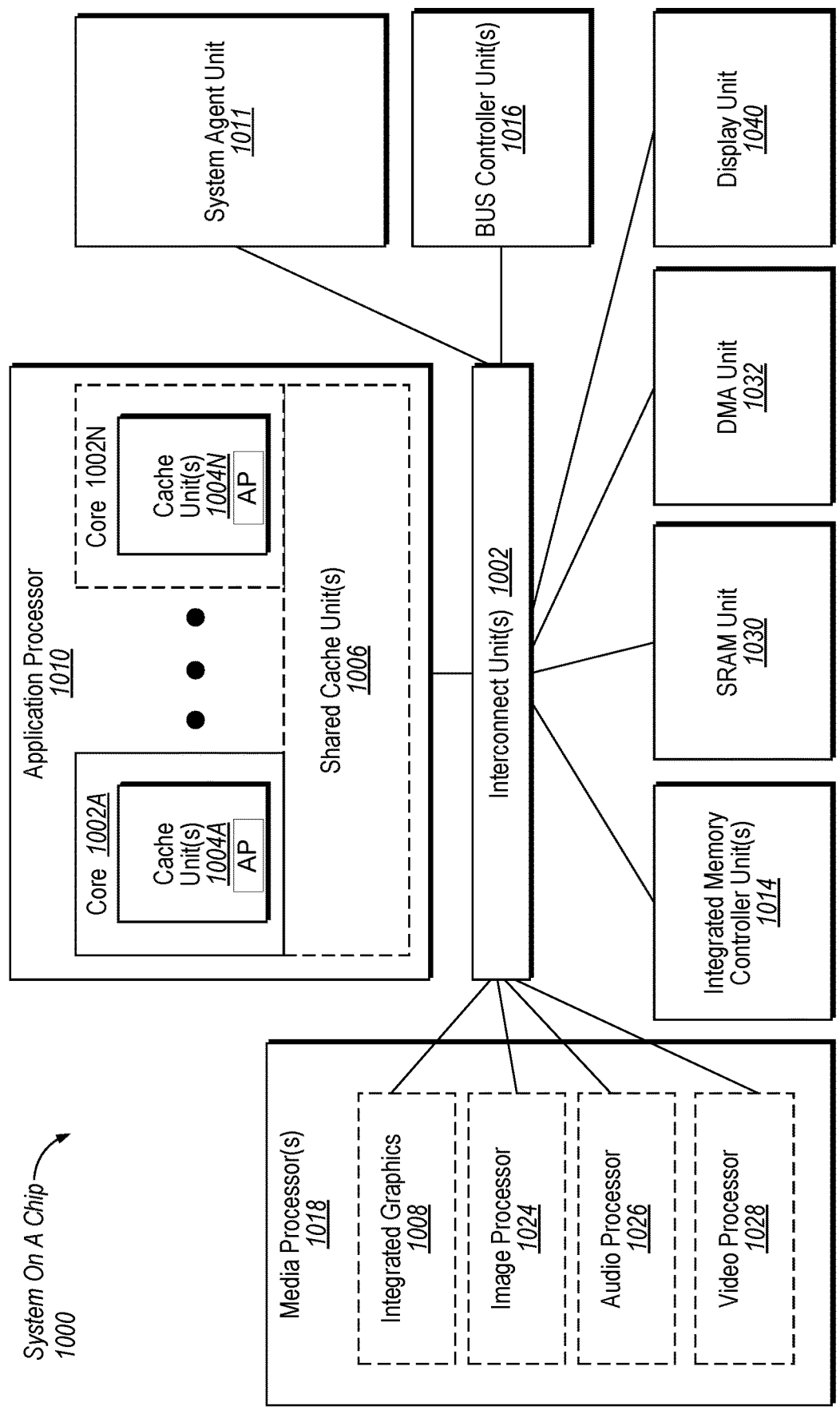
FIG. 10 is a block diagram illustrating a System-on-a-Chip (SoC) according to an embodiment of the disclosure.

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1010 (e.g., processing device 100A, 100B, 100C, and CPU 310) which includes a set of one or more cores 1002A-N and shared cache unit(s) 1006; a system agent unit 1011; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
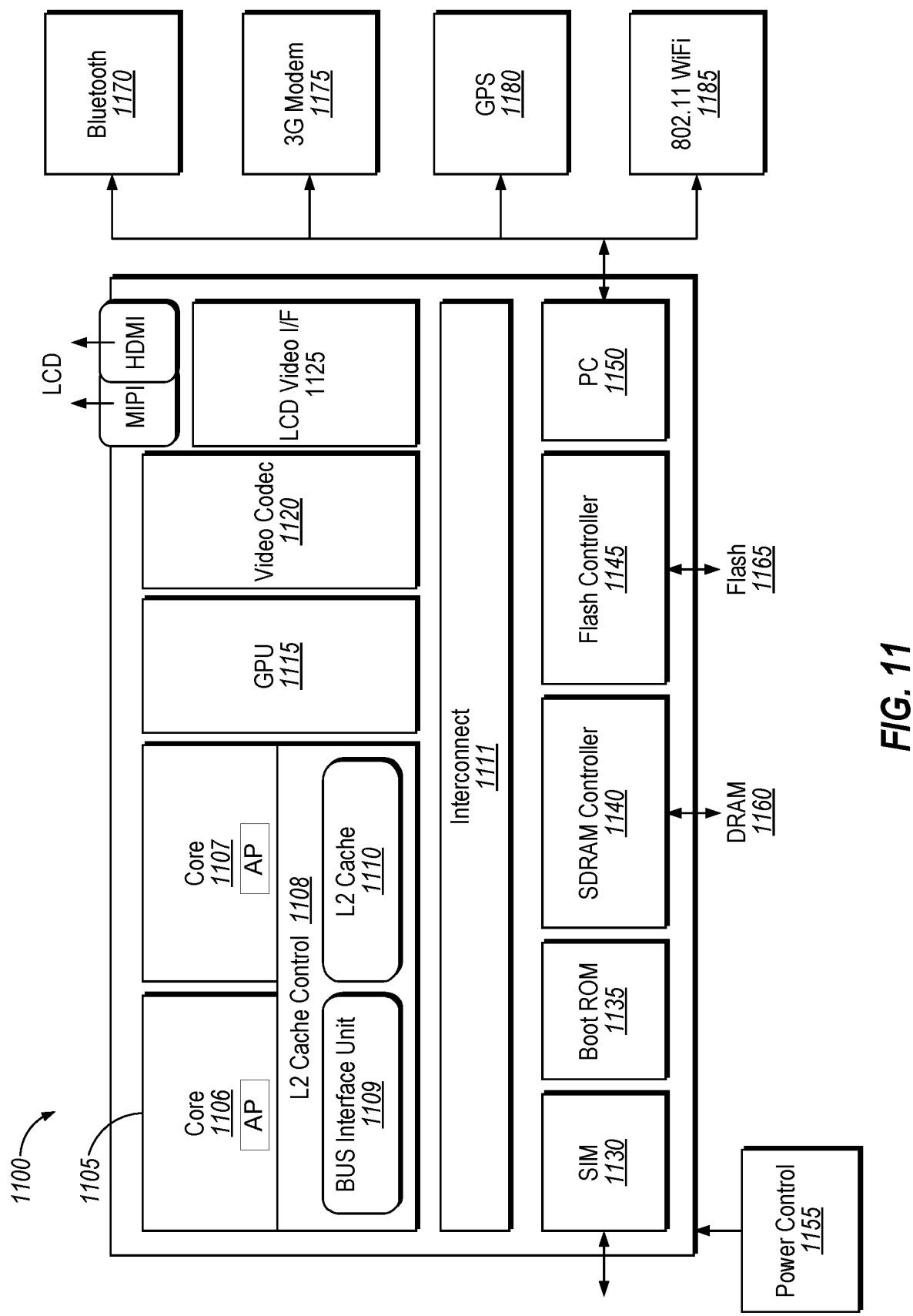
FIG. 11 is a block diagram illustrating a SoC design according to an embodiment of the disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
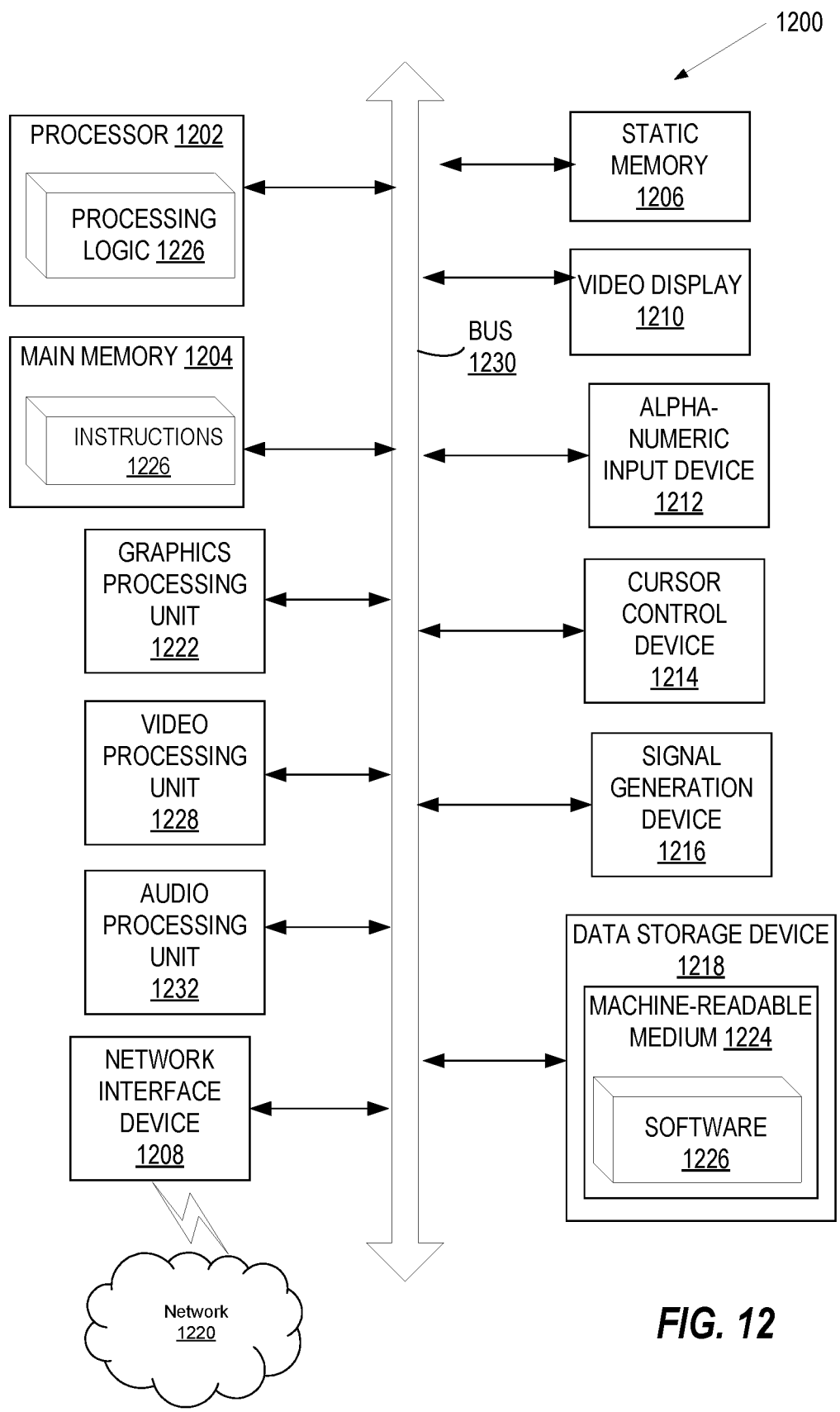
FIG. 12 illustrates a block diagram illustrating a computer system according to an embodiment of the disclosure.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processor comprising a core to execute an interrupt latency control unit (ILCU) software; and an interrupt controller circuitry coupled to the core. The interrupt controller circuitry comprises a first register to store a first time value at which a first interrupt is received at the interrupt controller circuitry; and a second register to store a second time value at which the first interrupt is delivered to the core by the interrupt controller circuitry. The ILCU is to: read the first time value in the first register and the second time value in the second register in response to the core receiving the first interrupt, the first interrupt having a first interrupt priority for a first type of interrupt; determine an amount of time the first interrupt was pending at the interrupt controller circuitry before the first interrupt was received by the core using the first time value and the second time value; determine interrupt configuration information that adjusts the first interrupt priority of a subsequent interrupt of the first type to a second interrupt priority that is different than the first interrupt priority; and send the interrupt configuration information to the interrupt controller circuitry, wherein the interrupt controller circuitry is to: receive the subsequent interrupt of the first type; and adjust the first interrupt priority of the subsequent interrupt to the second interrupt priority using the interrupt configuration information.

In Example 2, the processor of Example 1, wherein the interrupt controller circuitry is to: transmit the first interrupt having the first interrupt priority to the core; and transmit the subsequent interrupt having the second interrupt priority to the core.

In Example 3, the processor of Example 2, wherein the core is to: receive the first interrupt having the first interrupt priority from the interrupt controller circuitry; execute an interrupt service routine (ISR) associated with the first interrupt according to the first interrupt priority; receive the subsequent interrupt having the second interrupt priority from the interrupt controller circuitry; and execute the ISR associated with the subsequent interrupt according to the second interrupt priority.

In Example 4, the processor of Example 1, wherein the ILCU software is further to: store, in a data structure in memory, a first time value and a second time value of a respective plurality of interrupts received from the interrupt controller circuitry.

In Example 5, the processor of Example 4, wherein the ILCU software is further to: update, in the data structure, a first time value at which the subsequent interrupt, having the second interrupt priority, is received at the interrupt controller circuitry.

In Example 6, the processor of Example 4, wherein the ILCU software is further to: update, in the data structure, a second time value at which the subsequent interrupt, having the second interrupt priority, is delivered to the core by the interrupt controller circuitry.

In Example 7, the processor of Example 1, wherein the ILCU software is further to: determine the interrupt configuration information that adjusts the first interrupt priority of the subsequent interrupt of the first type to the second interrupt priority that is greater than the first interrupt priority.

In Example 8, the processor of Example 1, wherein the ILCU software is further to: determine the interrupt configuration information that adjusts the first interrupt priority of a subsequent interrupt of the first type to a second interrupt priority that is less than the first interrupt priority.

In Example 9, the processor of Example 1, wherein the ILCU software is further to:

determine an amount of time a second interrupt was pending at the interrupt controller circuitry before the second interrupt was received by the core using a first time value and a second time value of the second interrupt, the second interrupt having a second interrupt priority for a second type of interrupt; and determine the interrupt configuration information that adjusts the first interrupt priority of a subsequent interrupt of the first type to a second interrupt priority that is different than the first interrupt priority based on the amount of time the second interrupt was pending at the interrupt controller circuitry before the second interrupt was received by the core.

In Example 10, the processor of Example 1, wherein the interrupt controller circuitry is further to: transmit the subsequent interrupt having the second interrupt priority to a different core.

Various implementations may have different combinations of the structural features described above. For instance, all optional features of the processors and methods described above may also be implemented with respect to a system described herein and specifics in the examples may be used anywhere in one or more implementations.

Example 11 is a system comprising a memory device; and a core to execute an interrupt latency control unit (ILCU) software, the core coupled to the memory device; and an interrupt controller circuitry coupled to the core and the memory device. The interrupt controller circuitry comprises a first register to store a first time value at which a first interrupt is received at the interrupt controller circuitry; and a second register to store a second time value at which the first interrupt is delivered to the core by the interrupt controller circuitry. The ILCU is to: read the first time value in the first register and the second time value in the second register in response to the core receiving the first interrupt, the first interrupt having a first interrupt priority for a first type of interrupt; determine an amount of time the first interrupt was pending at the interrupt controller circuitry before the first interrupt was received by the core using the first time value and the second time value; determine interrupt configuration information that adjusts the first interrupt priority of a subsequent interrupt of the first type to a second interrupt priority that is different than the first interrupt priority; and send the interrupt configuration information to the interrupt controller circuitry, wherein the interrupt controller circuitry is to: receive the subsequent interrupt of the first type; and adjust the first interrupt priority of the subsequent interrupt to the second interrupt priority using the interrupt configuration information.

In Example 12, the system of Example 11, wherein the interrupt controller circuitry is to: transmit the first interrupt having the first interrupt priority to the core; and transmit the subsequent interrupt having the second interrupt priority to the core.

In Example 13, the system of Example 12, wherein the core is to: receive the first interrupt having the first interrupt priority from the interrupt controller circuitry; execute an interrupt service routine (ISR) associated with the first interrupt according to the first interrupt priority; receive the subsequent interrupt having the second interrupt priority from the interrupt controller circuitry; and execute the ISR associated with the subsequent interrupt according to the second interrupt priority.

In Example 14, the system of Example 11, wherein the ILCU software is further to: determine the interrupt configuration information that adjusts the first interrupt priority of the subsequent interrupt of the first type to the second interrupt priority that is greater than the first interrupt priority.

In Example 15, the system of Example 11, wherein the ILCU software is further to: determine the interrupt configuration information that adjusts the first interrupt priority of the subsequent interrupt of the first type to the second interrupt priority that is greater than the first interrupt priority.

In Example 16, the system of Example 11, wherein the ILCU software is further to: determine an amount of time a second interrupt was pending at the interrupt controller circuitry before the second interrupt was received by the core using a first time value and a second time value of the second interrupt, the second interrupt having a second interrupt priority for a second type of interrupt; and determine the interrupt configuration information that adjusts the first interrupt priority of a subsequent interrupt of the first type to a second interrupt priority that is different than the first interrupt priority based on the amount of time the second interrupt was pending at the interrupt controller circuitry before the second interrupt was received by the core.

In Example 17, the system of Example 11, wherein the interrupt controller circuitry is further to: transmit the subsequent interrupt having the second interrupt priority to a different core.

Various implementations may have different combinations of the structural features described above. For instance, all optional features of the processors and methods described above may also be implemented with respect to a system described herein and specifics in the examples may be used anywhere in one or more implementations.

Example 18 is a method that includes reading a first time value at which a first interrupt is received at an interrupt controller circuitry and a second time value at which the first interrupt is delivered to a core by the interrupt controller circuitry, the first interrupt having a first interrupt priority for a first type of interrupt; determining an amount of time the first interrupt was pending at the interrupt controller circuitry before the first interrupt was received by the core using the first time value and the second time value; determining interrupt configuration information that adjusts the first interrupt priority of a subsequent interrupt of the first type to a second interrupt priority that is different than the first interrupt priority; and sending the interrupt configuration information to the interrupt controller circuitry.

In Example 19, the method of Example 18, further comprising: updating, in a data structure in memory, the first time value at which the subsequent interrupt, having the second interrupt priority, is received at the interrupt controller circuitry, and the second time value at which the subsequent interrupt, having the second interrupt priority, is delivered to the core by the interrupt controller circuitry In Example 20, the method of Example 18, further comprising: determining an amount of time a second interrupt was pending at the interrupt controller circuitry before the second interrupt was received by the core using a first time value and a second time value of the second interrupt, the second interrupt having a second interrupt priority for a second type of interrupt; and determining the interrupt configuration information that adjusts the first interrupt priority of a subsequent interrupt of the first type to a second interrupt priority that is different than the first interrupt priority based on the amount of time the second interrupt was pending at the interrupt controller circuitry before the second interrupt was received by the core.

Various implementations may have different combinations of the structural features described above. For instance, all optional features of the processors and methods described above may also be implemented with respect to a system described herein and specifics in the examples may be used anywhere in one or more implementations.

In Example 21, is a non-transitory computer-readable medium storing instructions, which when executed by a processor, cause the processor to execute a plurality of logic operations comprising: read the first time value in the first register and the second time value in the second register in response to the core receiving the first interrupt, the first interrupt having a first interrupt priority for a first type of interrupt; determine an amount of time the first interrupt was pending at the interrupt controller circuitry before the first interrupt was received by the core using the first time value and the second time value; determine interrupt configuration information that adjusts the first interrupt priority of a subsequent interrupt of the first type to a second interrupt priority that is different than the first interrupt priority; and send the interrupt configuration information to the interrupt controller circuitry.

Example 22 is an apparatus comprising a means for reading the first time value in the first register and the second time value in the second register in response to the core receiving the first interrupt, the first interrupt having a first interrupt priority for a first type of interrupt; means for determining an amount of time the first interrupt was pending at the interrupt controller circuitry before the first interrupt was received by the core using the first time value and the second time value; means for determining interrupt configuration information that adjusts the first interrupt priority of a subsequent interrupt of the first type to a second interrupt priority that is different than the first interrupt priority; and means for sending the interrupt configuration information to the interrupt controller circuitry.

Various implementations may have different combinations of the structural features described above. For instance, all optional features of the processors and methods described above may also be implemented with respect to a system described herein and specifics in the examples may be used anywhere in one or more implementations.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a core to execute interrupt latency control unit (ILCU) software; and
   interrupt controller circuitry coupled to the core, wherein the interrupt controller circuitry comprises:
      a first register to store a first time value at which a first interrupt is received at the interrupt controller circuitry; and
      a second register to store a second time value at which the first interrupt is delivered to the core by the interrupt controller circuitry, wherein the ILCU software is to:
         read the first time value in the first register and the second time value in the second register in response to the core receiving the first interrupt, the first interrupt having a first interrupt priority for a first type of interrupt;
         determine an amount of time the first interrupt was pending at the interrupt controller circuitry before the first interrupt was received by the core using the first time value and the second time value;
         determine interrupt configuration information that adjusts the first interrupt priority of a subsequent interrupt of the first type to a second interrupt priority that is different than the first interrupt priority; and
         send the interrupt configuration information to the interrupt controller circuitry, wherein the interrupt controller circuitry is to:
            receive the subsequent interrupt of the first type; and
            adjust the first interrupt priority of the subsequent interrupt to the second interrupt priority using the interrupt configuration information.

2. The processor of claim 1, wherein the interrupt controller circuitry is to:
   transmit the first interrupt having the first interrupt priority to the core; and
   transmit the subsequent interrupt having the second interrupt priority to the core.

3. The processor of claim 2, wherein the core is to:
   receive the first interrupt having the first interrupt priority from the interrupt controller circuitry;
   execute an interrupt service routine (ISR) associated with the first interrupt according to the first interrupt priority;
   receive the subsequent interrupt having the second interrupt priority from the interrupt controller circuitry; and
   execute the ISR associated with the subsequent interrupt according to the second interrupt priority.

4. The processor of claim 1, wherein the ILCU software is further to:
   store, in a data structure in memory, a corresponding first time value and a corresponding second time value of each interrupt of a plurality of interrupts received from the interrupt controller circuitry.

5. The processor of claim 4, wherein the ILCU software is further to:
   update, in the data structure, the corresponding first time value at which the subsequent interrupt, having the second interrupt priority, is received at the interrupt controller circuitry.

6. The processor of claim 4, wherein the ILCU software is further to:
   update, in the data structure, the corresponding second time value at which the subsequent interrupt, having the second interrupt priority, is delivered to the core by the interrupt controller circuitry.

7. The processor of claim 1, wherein the second interrupt priority is greater than the first interrupt priority.

8. The processor of claim 1, wherein the second interrupt priority is less than the first interrupt priority.

9. The processor of claim 1, wherein the ILCU software is further to:
   determine a second amount of time a second interrupt was pending at the interrupt controller circuitry before the second interrupt was received by the core using a corresponding first time value and a corresponding second time value of the second interrupt, the second interrupt having the second interrupt priority for a second type of interrupt; and
   generate second interrupt configuration information that adjusts the first interrupt priority of a corresponding subsequent interrupt of the first type to the second interrupt priority that is different than the first interrupt priority based on the second amount of time the second interrupt was pending at the interrupt controller circuitry before the second interrupt was received by the core.

10. The processor of claim 1, wherein the interrupt controller circuitry is further to:
    transmit the subsequent interrupt having the second interrupt priority to a different core.

11. A system comprising:
a memory device;
a core to execute interrupt latency control unit (ILCU) software, the core coupled to the memory device; and
interrupt controller circuitry coupled to the core and the memory device, wherein the interrupt controller circuitry comprises:
a first register to store a first time value at which a first interrupt is received at the interrupt controller circuitry; and
a second register to store a second time value at which the first interrupt is delivered to the core by the interrupt controller circuitry, wherein the ILCU software is to:
read the first time value in the first register and the second time value in the second register in response to the core receiving the first interrupt, the first interrupt having a first interrupt priority for a first type of interrupt;
determine an amount of time the first interrupt was pending at the interrupt controller circuitry before the first interrupt was received by the core using the first time value and the second time value;
determine interrupt configuration information that adjusts the first interrupt priority of a subsequent interrupt of the first type to a second interrupt priority that is different than the first interrupt priority; and
send the interrupt configuration information to the interrupt controller circuitry, wherein the interrupt controller circuitry is to:
receive the subsequent interrupt of the first type; and
adjust the first interrupt priority of the subsequent interrupt to the second interrupt priority using the interrupt configuration information.

12. The system of claim 11, wherein the interrupt controller circuitry is to:
transmit the first interrupt having the first interrupt priority to the core; and
transmit the subsequent interrupt having the second interrupt priority to the core.

13. The system of claim 12, wherein the core is to:
receive the first interrupt having the first interrupt priority from the interrupt controller circuitry;
execute an interrupt service routine (ISR) associated with the first interrupt according to the first interrupt priority;
receive the subsequent interrupt having the second interrupt priority from the interrupt controller circuitry; and
execute the ISR associated with the subsequent interrupt according to the second interrupt priority.

14. The system of claim 11, wherein the second interrupt priority is greater than the first interrupt priority.

15. The system of claim 11, wherein the second interrupt priority is less than the first interrupt priority.

16. The system of claim 11, wherein the ILCU software is further to:
determine a second amount of time a second interrupt was pending at the interrupt controller circuitry before the second interrupt was received by the core using a corresponding first time value and a corresponding second time value of the second interrupt, the second interrupt having the second interrupt priority for a second type of interrupt; and
determine second interrupt configuration information that adjusts the first interrupt priority of a corresponding subsequent interrupt of the first type to the second interrupt priority that is different than the first interrupt priority based on the second amount of time the second interrupt was pending at the interrupt controller circuitry before the second interrupt was received by the core.

17. The system of claim 11, wherein the interrupt controller circuitry is further to:
transmit the subsequent interrupt having the second interrupt priority to a different core.

18. A method comprising:
reading, by a core from a first register in interrupt controller circuitry, a first time value at which a first interrupt is received at the interrupt controller circuitry;
reading, by the core from a second register in the interrupt controller circuitry, a second time value at which the first interrupt is delivered to the core by the interrupt controller circuitry, the first interrupt having a first interrupt priority for a first type of interrupt;
determining, by the core, an amount of time the first interrupt was pending at the interrupt controller circuitry before the first interrupt was received by the core using the first time value and the second time value;
generating, by the core, interrupt configuration information to adjust the first interrupt priority of a subsequent interrupt of the first type to a second interrupt priority that is different than the first interrupt priority; and
sending, by the core, the interrupt configuration information to the interrupt controller circuitry, wherein the interrupt controller circuitry is to receive the subsequent interrupt of the first type and adjust the first interrupt priority of the subsequent interrupt to the second interrupt priority using the interrupt configuration information.

19. The method of claim 18, further comprising:
updating, in a data structure in memory, a corresponding first time value at which the subsequent interrupt, having the second interrupt priority, is received at the interrupt controller circuitry, and a corresponding second time value at which the subsequent interrupt, having the second interrupt priority, is delivered to the core by the interrupt controller circuitry.

20. The method of claim 18, further comprising:
determining a second amount of time a second interrupt was pending at the interrupt controller circuitry before the second interrupt was received by the core using a corresponding first time value and a corresponding second time value of the second interrupt, the second interrupt having the second interrupt priority for a second type of interrupt; and
determining second interrupt configuration information that adjusts the first interrupt priority of a corresponding subsequent interrupt of the first type to the second interrupt priority that is different than the first interrupt priority based on the second amount of time the second interrupt was pending at the interrupt controller circuitry before the second interrupt was received by the core.

* * * * *